(12) United States Patent
Master (10) Patent No.: US 11,768,965 B2
(45) Date of Patent: Sep. 26, 2023

(54) SYSTEM AND METHOD FOR SECURELY STORING DATA IN A SIM (71) Applicant: iCrypto, Inc., Beaverton, OR (US)

(72) Inventor: Adarbad Master, Oldsmar, FL (US)

(73) Assignee: iCrypto, Inc, Beaverton, OR (US)

(*) Notice: Subject to any disclaimer, the term of this patent is extended or adjusted under 35 U.S.C. 154(b) by 351 days.

(21) Appl. No.: 16/635,772

(22) PCT Filed: Aug. 9, 2018

(86) PCT No.: PCT/US2018/046087
§ 371 (c)(1),
(2) Date: Jan. 31, 2020

(87) PCT Pub. No.: WO2019/074572
PCT Pub. Date: Apr. 18, 2019

(65) Prior Publication Data
US 2020/0334383 A1 Oct. 22, 2020

Related U.S. Application Data (60) Provisional application No. 62/542,935, filed on Aug. 9, 2017.

(51) Int. Cl.
G06F 21/75 (2013.01)
G06F 21/78 (2013.01)
H04W 12/12 (2021.01)
H04W 12/40 (2021.01)

(52) U.S. Cl.
CPC ............... G06F 21/75 (2013.01); G06F 21/78 (2013.01); H04W 12/12 (2013.01); H04W 12/40 (2021.01)

(58) Field of Classification Search
CPC ........ G06F 21/75; G06F 21/78; H04W 12/35; H04W 12/40; H04W 12/48
See application file for complete search history.

(56) References Cited

U.S. PATENT DOCUMENTS

| 8,807,440 | B1 | 8/2014 | Von Behren | |
| 2006/0058024 | A1* | 3/2006 | Manner | G06F 16/178 |
| | | | | 455/432.3 |
| 2006/0149916 | A1 | 7/2006 | Nase | |
| 2010/0313277 | A1 | 12/2010 | Pepin | |

(Continued)

FOREIGN PATENT DOCUMENTS

| WO | WO-0031997 A1 * | 6/2000 | ........... G06Q 20/341 |
| WO | WO-0225976 A1 * | 3/2002 | ........... H04W 88/02 |
| WO | 2014023998 B1 | 2/2014 | |

OTHER PUBLICATIONS

International Search Authority (ISA), "International Search Report," International Application No. PCT/US2018/046087, dated Oct. 18, 2018, 2018, 2 pages, publisher Commissioner for Patents—PCT, Alexandria, VA, United States of America.

(Continued)

Primary Examiner — Ellen Tran
(74) Attorney, Agent, or Firm — Fogarty LLP (57) ABSTRACT Embodiments of the invention provide systems and methods for analyzing a Subscriber Identity Module (SIM) card, ascertaining multiple distally separated storable sections, and then securely storing data as an ordered list of storable sections representing a concatenated available storage on the SIM.

17 Claims, 5 Drawing Sheets (56) References Cited

U.S. PATENT DOCUMENTS

| | | |
|---|---|---|
| 2011/0320763 A1 | 12/2011 | Gonion |
| 2014/0258726 A1 | 9/2014 | Fukuda |
| 2016/0014594 A1* | 1/2016 | Hans ..................... H04W 8/183 |
| | | 455/558 |
| 2016/0286380 A1 | 9/2016 | Long |
| 2017/0099604 A1 | 4/2017 | Raleigh et al. |

OTHER PUBLICATIONS

International Search Authority (ISA), "Written Opinion," International Application No. PCT/US2018/046087, dated Oct. 18, 2018, 6 pages, publisher Commissioner for Patents—PCT, Alexandria, VA, United States of America.

\* cited by examiner

SYSTEM AND METHOD FOR SECURELY STORING DATA IN A SIM

CROSS-REFERENCE TO RELATED APPLICATIONS

This application claims the benefit of the filing date of U.S. Provisional Patent Application No. 62/542,935, which was filed Aug. 9, 2017, the disclosure of which is hereby incorporated by reference herein in its entirety.

BACKGROUND

Secure storage of data on a mobile phone or device is increasingly difficult. Sophisticated means can be applied to extract information once sufficient privilege is obtained about the operating system onboard the mobile phone or device.

SUMMARY OF THE INVENTION

Embodiments of the invention provide systems and methods for analyzing a Subscriber Identity Module (SIM) card, ascertaining storable sections, and then securely storing data in them in a way where inspection of the SIM cannot reveal the data.

BRIEF DESCRIPTION OF THE DRAWINGS

Having thus described the invention in general terms, reference will now be made to the accompanying drawings, wherein:

DETAILED DESCRIPTION

The invention will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

A SIM is a compartmentalized storage that is abstracted from the operating system on a mobile phone or device and cannot be accessed by normal means. Storage on the SIM is possible only via intervention by the mobile network operator.

The systems and methods disclosed herein teach how a process can be implemented for applications outside the mobile network operator boundary to store arbitrary data on a SIM. The disclosure also shows how to make such data hidden from other applications and SIM forensic devices. In addition, the systems and methods will show how to make the storage of data in each SIM unique, such that inspection of one SIM yields no information on how data is stored on all other SIMs. In practice, this method can be used to store any personal private information, such as encryption keys, banking details, health care records, and data from security applications installed on or off the device.

The following terms are used in the disclosure:

"SIM" refers to a Subscriber Identity Module, which is an integrated circuit that is intended to securely store data which are used to identify and authenticate subscribers on mobile devices. A SIM may also be implemented as a Universal Subscriber Identity Module (USIM).

"Secure SIM Server" refers to the application that keeps track of data allocation within a SIM.

"MNO" refers to a Mobile Network Operator, commonly known as the cellular company.

"ICCID" refers to the SIM international identity of its Integrated Circuit Card Identifier. ICCIDs are stored in the SIM cards and are also engraved or printed on the SIM card body during a process called personalization. The ICCID is defined by the ITU-T Recommendation E.118 as the Primary Account Number.

Other terms, unless defined here, refer to commonly known industry terms.

Every SIM/USIM card is a smart card containing a microprocessor, three types of memory, namely RAM, ROM and EEPROM, and some integrated logic to manage card security. The filesystem with all the non-volatile programmable data is stored in the EEPROM and has a hierarchical structure. The filesystem is organized as an n-ary tree with a root file called Master File (MF). Basically, there are two types of files: directories, called Dedicated Files (DF), and files, called Elementary Files (EF). Given the fact that the filesystem has a nested structure, it is important to know that a DF contains only a header, whereas an EF contains a header and a body.

The entire SIM/USIM filesystem can be mapped by a tool (SIM Extractor) that acquires the entire contents of a smart card memory. Using this tool, the following can be ascertained for each file:

ID of the element;
Standard name of an EF or DF;
File type (e.g., MF, DF, or EF)
Privileges, which are related to the constraints on the execution of a set of commands;
Structure of file (e.g., transparent, linear fixed, or cyclic);
Father of nodes, which are important to see the real structure of the n-ary tree; and
Size of the files.

Figure 1:
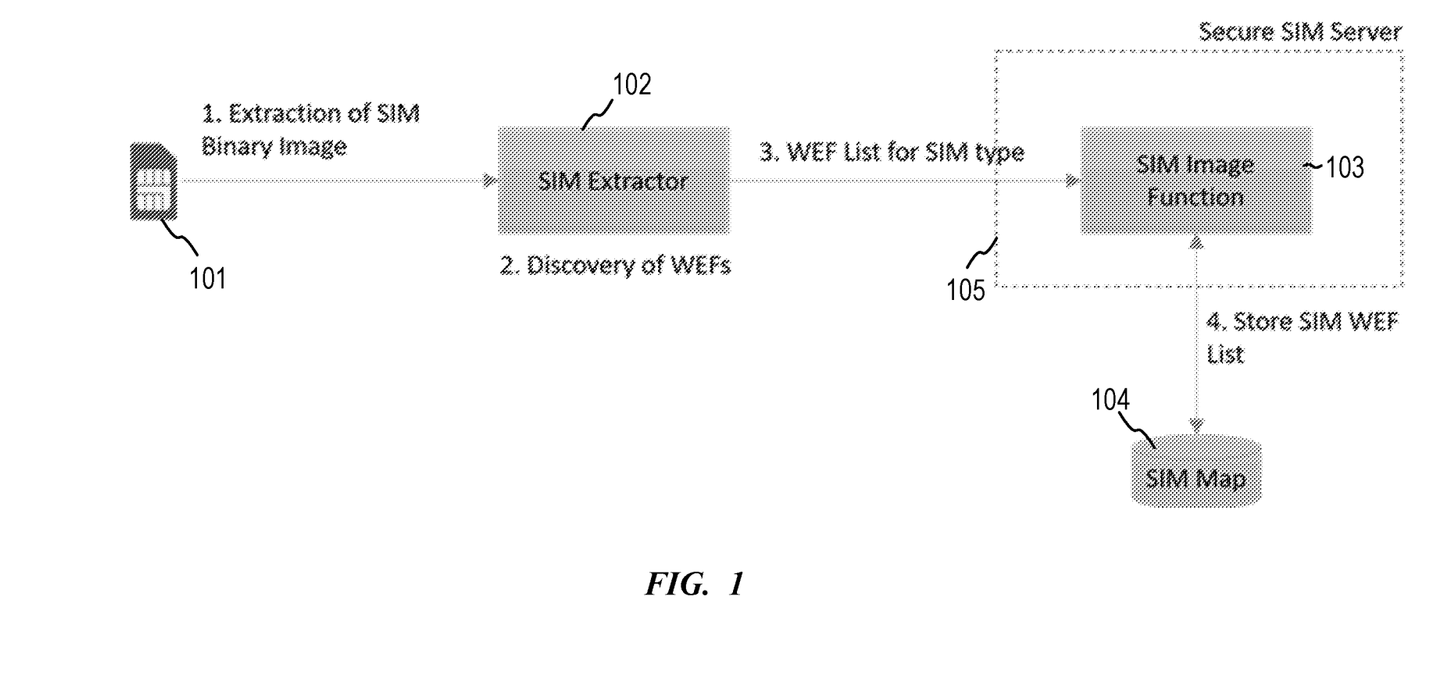
FIG. 1 illustrates a SIM filesystem mapping process according to an example embodiment.

FIG. 1 illustrates a SIM filesystem mapping process according to one embodiment. A SIM Extractor 102 extracts a SIM binary image from SIM 101. The SIM Extractor 102 notes the GSMA-standard-defined EFs, and the process concentrates on those files that are not part of the standard and yet have Update privilege. For this disclosure, these files (i.e., EFs with Update privilege) are called Writable EFs (WEF). Each SIM type will have a unique set of WEFs, and the total amount of writeable storage will vary from SIM type to SIM type. Generally, a 128 KB SIM may have up to 32 KB of WEFs available for storage. Larger SIMs may have even more. The size of each WEF is not the same and can range from 20 bytes to 10 KB.

Once the set of these WEFs are acquired by a SIM Image Function 103, the list of WEF per SIM type are stored within the SIM Map database 104 within the Secure SIM Server 105. Each SIM of the same type will have the same list of available WEFs. In practice, at a carrier, the number of types of SIM are limited since these are usually the result of large bulk orders.

Figure 2:
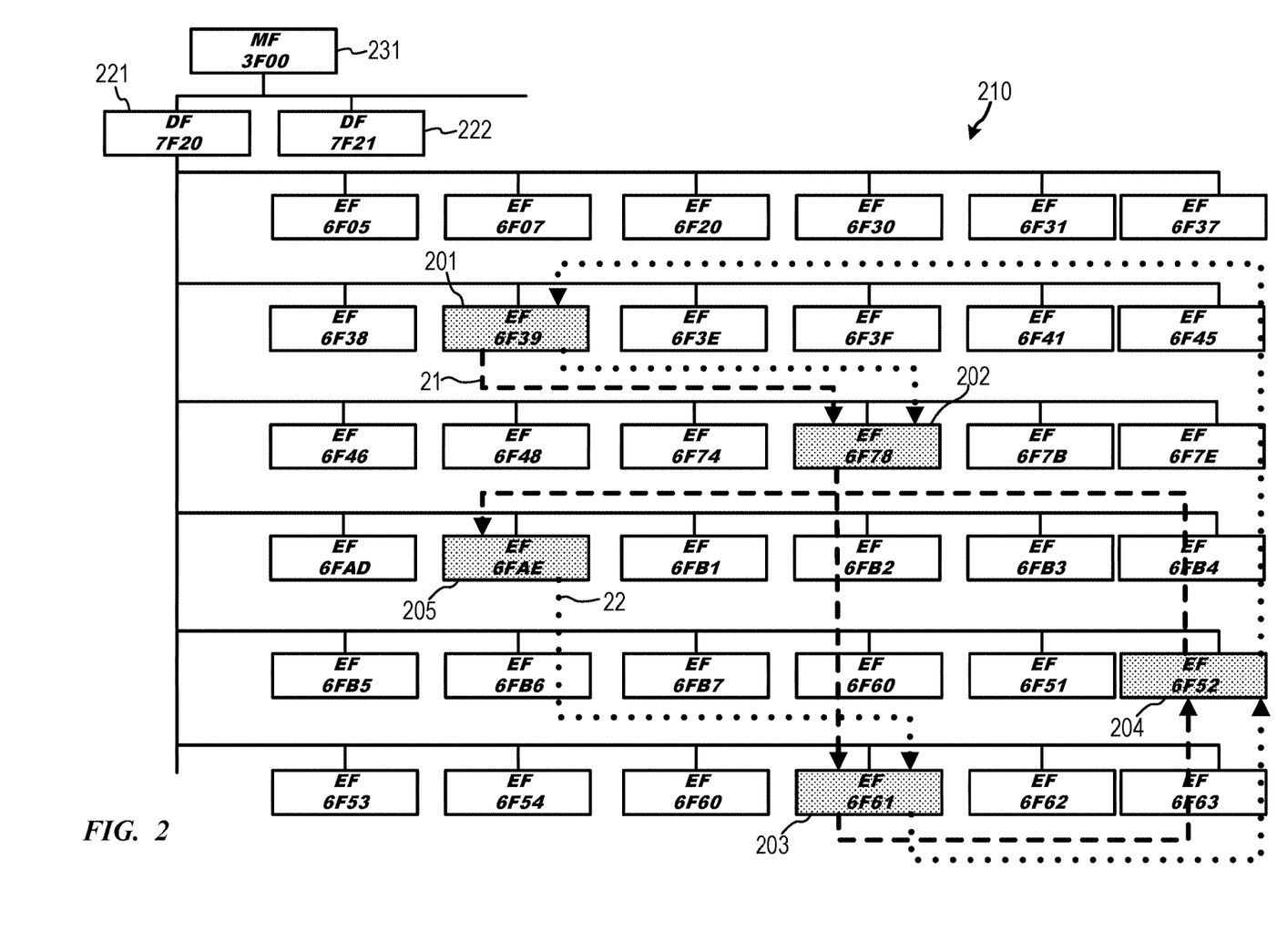
FIG. 2 illustrates WEF Chaining in a SIM.

FIG. 2 illustrates WEF Chaining in a SIM according to an example embodiment. The binary image of a SIM has been extracted and the filesystem map created. A root master file (MF3F00) 231 is the parent node to directory files, such as DF7F20 (221) and DF2F21 (222). DF7F20 (221) is the parent node for a plurality of elementary files (210). It will be understood that FIG. 2 is a simplified illustration and that a SIM will have other directory files (DFs) under root file (MF) 231. Each DF may be the parent to other DFs and/or elementary files (EFs). A USIM specification controls exactly the DF and EF that should be present on the SIM. Each EF has a very specific access policy defined. EF contents, location, and size are specified in 3GPP specifications. All SIMs must provide these writeable segments and the data structure contained therein are fixed by the specification.

WEFs are EFs that have update and read privileges but are not part of the specification. The WEFs may be accessed by users but make up a small segment of SIMs total capacity depending on SIM. Files 201-205 for the example SIM type illustrated in FIG. 2 are determined to be WEFs. With each set of WEFs, a filesystem can be created by chaining together the WEFs 201-205. This can be done for each SIM by selecting a different chain of WEFs 201-205 as shown in the FIG. 2.

A first WEF chain (dashed lines 21) is created by linking the WEFs together in order: EF6F39 (201)→EF6F78 (202) →EF6F61 (203)→EF6F52 (204)→EF6FAE (205). A second WEF chain (dotted lines 22) can be created by linking the WEFs together in a different order: EF6FAE (205) →EF6F61 (203)→EF6F52 (204)→EF6F39 (201)→EF6F78 (202).

There are a limited number of combinations for a given set of WEF's. However, the number of combinations is quite large since the number is based on the factorial count of the number of WEFs. A WEF count of N will yield N! such combinations or chains. For example, if there are 35 WEFs in a SIM, then there are $1.033 \times 10^{40}$ possible combinations or chains for that SIM.

In one embodiment, only the Secure SIM Server will know what chaining sequence of WEFs has been assigned to each SIM. Each SIM can be identified by a Mobile Station International Subscriber Directory Number (MSISDN), which in turn can be paired with a sequence of WEFs for that SIM or SIM type. It should be noted that even though each chain of WEFs is unique, the size of the storable area is the same for each SIM type.

FIG. 1 illustrates file allocation to a WEF Chain according to an example embodiment. For a filesystem to be mapped to each WEF Chain, fragments are constructed out of each WEF that is greater than some known size. In one embodiment, this size may be set at 256 bytes. Any fragments less than 256 bytes are then pooled together to create new 256-byte fragments.

The fragments are the basic building blocks of the filesystem. Several blocks can be allocated to form a file that can be used to store data. The number of blocks allocated depends on the size of the file, which is in multiples of the block size. Using a 256-byte block size, four blocks will store a 1 KB file. A block that is assigned from the pool to a file is recorded by the Secure SIM Server as allocated, while the others are marked as free (i.e., awaiting allocation).

The Secure SIM Server keeps track of the allocated and free blocks in each SIM and the composition and order of blocks that make up the file. The smallest file that can be created is the size of the block (i.e., 256 bytes) and the largest file depends on the number of free blocks available.

Figure 3:
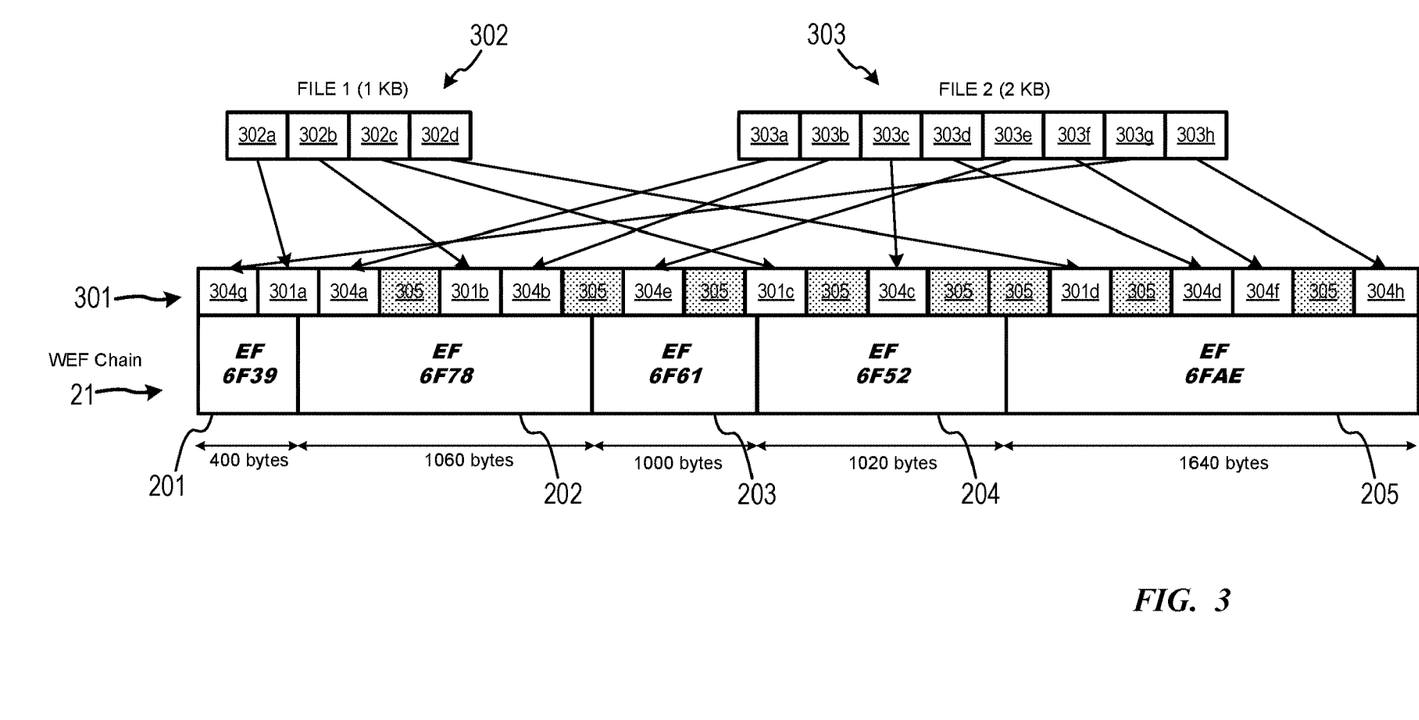
FIG. 3 illustrates a WEF Chain divided into blocks with file fragments stored to the blocks.

FIG. 3 illustrates WEF Chain 21 as shown in FIG. 2, which comprises WEFs 201-205. Each WEF can have a different size. For example, the sizes of WEFs 201-205 are 400, 1060, 1000, 1020, and 1640 bytes, respectively. When these WEFs are linked together, WEF Chain 21 has 5120 bytes total, which can be divided into twenty 256-byte blocks 301. Data, such as File 302 (which is 1 KB in size) and File 303 (which is 2 KB in size) can be divided into a number of 256-byte fragments and stored in blocks 301 of WEF Chain 21. For example, File 302 can be divided into four 256-byte fragments 302a-d, which can then be stored in blocks 301a-d of WEF Chain 21. File 303 can be similarly divided into eight 256-byte fragments (303a-h) to be stored in blocks 304a-h in WEF Chain 21. The remaining eight blocks 305 in WEF Chain 21 are available to store up to 2 KB worth of additional data from one or more other files.

In FIG. 3, File 302 has been divided into fragments that are stored in random locations of Chain 21. The fragments 301a-d of File 302 are interleaved with fragments 304a-h of File 303 in Chain 21, wherein the fragments 304a-h of File 303 have been further interleaved with each other. To get the original File 302 and File 303 from Chain 21, one would need to know: the WEF chain sequence, the size of each block, how each block is associated with each WEF (e.g., an EF address and offset for the start of each block), and then the sequence or series in which the fragments 302a-d and 303a-h are stored in particular blocks 301. This becomes computationally impossible based upon the number of variables involved.

It should be noted that the superblock, which is the section of the file that keeps track of block allocation and file assignment is not on the SIM. The superblock is only stored on the Secure SIM Server. Therefore, only the Secure SIM Server stores the information required to determine which WEFs, and what offset in each WEF, is contributing to the block in a particular file. Without that map, it is almost impossible for a SIM forensic tool to ascertain the data that is resident on the SIM since the ordering of the data and indeed the total number of allocated blocks, is not known.

Figure 4:
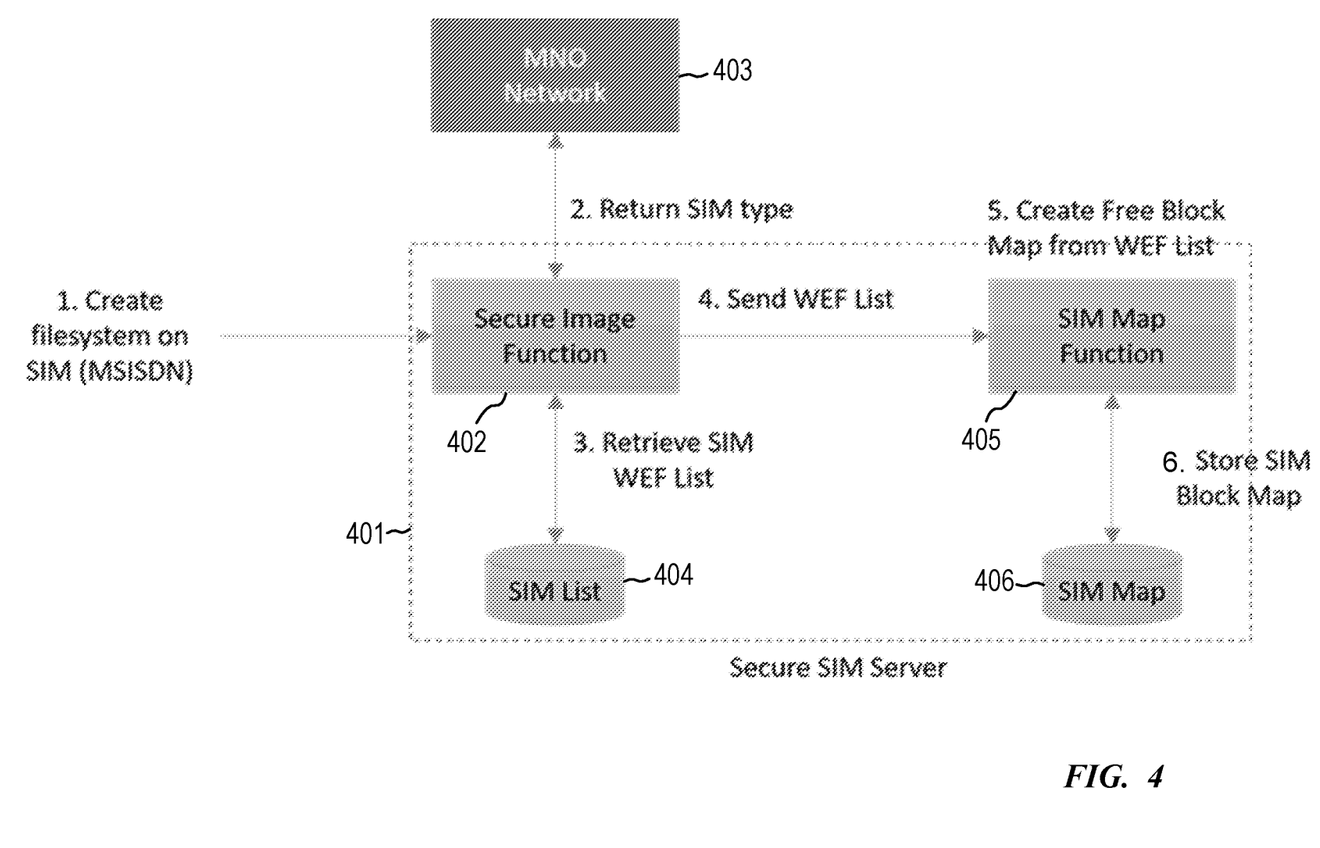
FIG. 4 is a flowchart illustrating Secure SIM Server functions according to one embodiment.

FIG. 4 is a flowchart illustrating Secure SIM Server 401 functions according to one embodiment. A SIM can be identified, for example, using an MSISDN or ICCID. To create a filesystem on the SIM, the Secure Image Function 402 communicates with the MNO network 403 to determine the type of SIM based on the ICCID of the SIM. Secure Image Function 402 then extracts the SIM's WEF list from SIM database 404. The WEF list has been pre-determined at the time of the SIM personalization for this SIM type. Secure Image Function 402 then sends this WEF list data to the SIM Map Function 405. SIM Map Function 405 creates a new file on the SIM by collecting available free blocks into a chain. SIM Map Function 405 then stores the SIM block map to SIM Map database 406.

The filesystem created on the SIM is a series of bytes stored in various EFs. The actual locations of the bytes stored in various EFs are known only to the SIM Map Function 405 in the Secure SIM Server 401. In one embodiment, a mechanism employed for reading and updating data from the WEFs is Remote File Management (RFM), which is a protocol defined by the GSM 03.48 standard.

Figure 5:
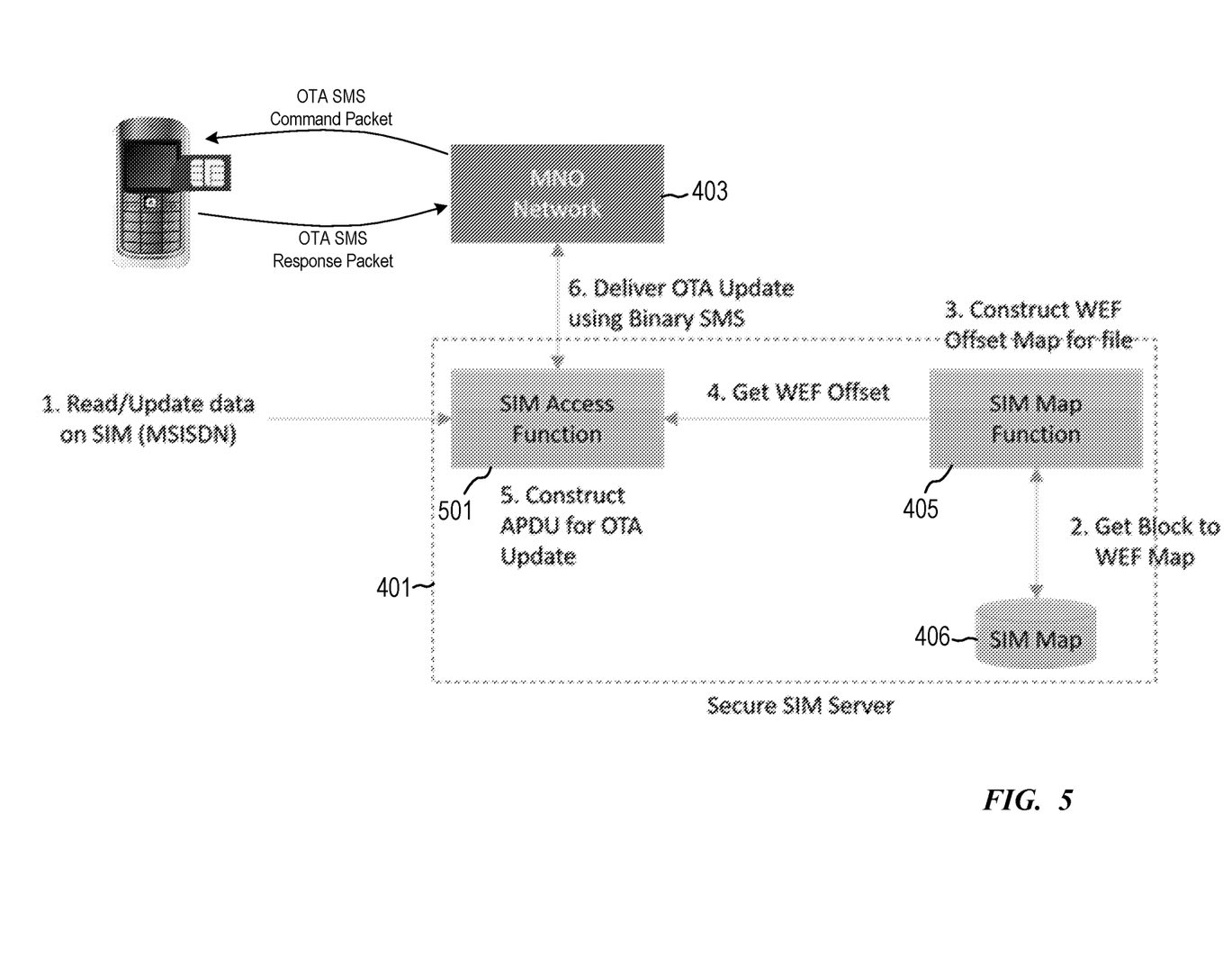
FIG. 5 is a flowchart illustrating an example SIM updating process.

FIG. 5 is a flowchart illustrating a SIM updating process. In an example embodiment, the file is a single WEF at 7F10/6F42. The Secure SIM Server 401 takes the following steps when an application requests to read/update the file content:

1) Receive, at a SIM Access Function 501, a request for read or update on a file in the SIM by name (e.g., identify the SIM using an MSISDN or ICCID).

2) Refer to the SIM Map 406 and ascertain that the file is a single segment of 256 bytes located, for example, in the WEF 7F10/6F42 at a byte offset of 12.

3) Map the data to the WEF and offset list as a series of read/update operations.

4) Return the operations list.

5) Construct appropriate application protocol data unit (APDU) command for read/update of the file based on the list by the SIM Access Function 501.

6) Send the APDU command from the SIM Access Function 501 over the air (OTA) to the device using binary SMS (e.g., the MSISDN of the SIM may be the reference in this case) via MNO network 403. SIM Access Function 501 then receives the data as a response (in case of read), or a delivery notification (in case of an update).

This process results in the file on a SIM that is updated silently without the user of the device intervening or even being aware of the update. WEPs be accessed using standard Remote File Management protocol commands delivered using Binary SMS. The provisioning of GSM-specified EFs having dynamic content is a standard function at an MNO. For a large file, there may be several commands sent using multiple SMS deliveries. Each command may access a designated offset within the WEF list. When multiple commands are issued, the SIM Access Function 501 maintains transactional integrity by making sure that all the reads and writes are completed and then assembling the result.

An example method comprises imaging a SIM and mapping storage areas that are writable without overlap by standard GSM services. The method may further comprise chaining storage areas into a concatenated store that is unique to each SIM and defined by a storage location map that is kept secret. The method may further comprise storing data by dividing the store into segments and writing each segment at a place. The data may be compounded in a manner that is known only to originator.

It should be understood that the various operations described herein, particularly in connection with FIGS. 1-5, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method of securely storing data, the method comprising:
    mapping a file structure for a smart card memory such that each smart card memory is unique;
    identifying files in the file structure that have an update privilege; and
    creating an ordered list of the update-privileged files wherein the ordered list represents a concatenated available storage on the smart card memory;
    tracking the file structure of the smart card memory with an application on a secure server;
    dividing the ordered list into a plurality of blocks;
    creating a chain sequence from a randomly selected subset of the blocks; and
    securely writing the data to the blocks in the chain sequence.

2. The method of claim 1, wherein the smart card memory is a subscriber identity module (SIM) for a mobile device.

3. The method of claim 2, wherein the files comprise elementary files, and wherein the update privilege files comprise writable elementary files.

4. The method of claim 1, further comprising:
    saving the ordered list of update-privileged files to a smart card memory map database.

5. The method of claim 4, wherein the smart card memory map database is separate from the smart card.

6. The method of claim 1, further comprising:
    associating the ordered list of update-privileged files to a specific smart card memory.

7. The method of claim 1, further comprising:
    associating the ordered list of update-privileged files to a specific type of smart card memory.

8. A method for securely storing data to a subscriber identity module (SIM), comprising:
    retrieving a storage location map for the SIM from a secure server, wherein the storage location map defines a unique chain of writable storage areas on the SIM;
    dividing the chain of writable storage areas into a plurality of blocks, and
    creating a chain sequence from a randomly selected subset of the blocks, and
    securely writing the data to the blocks in the chain sequence.

9. The method of claim 8, wherein the storage location map is retrieved from a database remote from the SIM.

10. The method of claim 8, wherein the storage areas are writable without overlap by standard GSM services.

11. The method of claim 8, wherein the segments of the writable storage areas have a same size.

12. The method of claim 8, wherein the segments are identified as a writable elementary file plus an offset.

13. The method of claim 8, further comprising:
    sending data to be written to the SIM using binary SMS messages sent to a device on a mobile network.

14. The method of claim 8, further comprising:
    receiving a notification from a mobile device that the data was written to the SIM.

15. A secure subscriber identity module (SIM) server, comprising at least one processor and a memory coupled to the at least one processor, the memory storing program instructions executable by the at least one processor to cause the secure SIM server to:
    provide a secure image function configured to identify unique writable storage areas on a SIM;
    provide a SIM map function configured to create an ordered list of a plurality of writable storage areas, wherein the ordered list represents a concatenated available storage on the SIM to enable secure storage of data; and
    provide a SIM access function configured to divide the ordered list into a plurality of blocks, create a chain sequence from a randomly selected subset of the blocks, and securely write the data to the blocks in the chain sequence.

16. The secure SIM server of claim 15, wherein the SIM map function is further configured to divide the concatenated store on the SIM into segments, wherein the segments are defined by a writable elementary file plus an offset.

17. The secure SIM server of claim 15, wherein the ordered list of writable storage areas is associated with a specific SIM.

* * * * *